United States Patent
Gaster

(10) Patent No.: US 8,172,185 B2
(45) Date of Patent: May 8, 2012

(54) ESTABLISHMENT OF LAMINAR BOUNDARY LAYER FLOW ON AN AEROFOIL BODY

(75) Inventor: Micheal Gaster, Richmond (GB)

(73) Assignee: Gaster Consultants Ltd, Surrey (GB)

( * ) Notice: Subject to any disclaimer, the term of this patent is extended or adjusted under 35 U.S.C. 154(b) by 391 days.

(21) Appl. No.: 12/448,437

(22) PCT Filed: Dec. 20, 2007

(86) PCT No.: PCT/GB2007/050773
§ 371 (c)(1),
(2), (4) Date: Jun. 19, 2009

(87) PCT Pub. No.: WO2008/075106
PCT Pub. Date: Jun. 26, 2008

(65) Prior Publication Data
US 2010/0044520 A1 Feb. 25, 2010

(30) Foreign Application Priority Data
Dec. 21, 2006 (GB) .................................. 0625612.7

(51) Int. Cl.
*B64C 23/06* (2006.01)
(52) U.S. Cl. .................. 244/199.1; 244/130; 244/199.3; 244/200
(58) Field of Classification Search .................. 244/130, 244/199.1, 200, 200.1, 204, 199.3, 208–211
See application file for complete search history.

(56) References Cited

U.S. PATENT DOCUMENTS

| | | | |
|---|---|---|---|
| 3,288,399 | A | 11/1966 | Gaster |
| 3,406,929 | A | 10/1968 | Young |
| 4,114,836 | A | 9/1978 | Graham et al. |
| 4,477,040 | A | 10/1984 | Karanik |
| 5,037,044 | A | 8/1991 | Seyfang |
| 5,348,256 | A | 9/1994 | Parikh |

FOREIGN PATENT DOCUMENTS

| | | |
|---|---|---|
| EP | 0 267 023 | 5/1988 |
| EP | 0 776 821 | 6/1997 |
| GB | 0 408 457 | 4/1934 |
| GB | 2 093 152 | 8/1982 |

OTHER PUBLICATIONS

Holmes, Bruce J., "Swept Wing Attachment Line Contamination Fence", Dec. 13, 1991.*

* cited by examiner

*Primary Examiner* — Timothy D Collins
*Assistant Examiner* — Jamie S Stehle
(74) *Attorney, Agent, or Firm* — Carmody & Torrance LLP

(57) ABSTRACT

In order to establish laminar flow on the attachment line (18) of an aerofoil body, a duct entrance (27) is provided on the leading edge of the aerofoil body for receiving spanwise boundary layer flow BLt. The exit (23) of the duct is located spanwise downstream of the duct entrance (27). The boundary layer flow BLt enters the duct (23) and is discharged downstream. The height of the duct entrance (27) above the leading edge of the aerofoil body is greater than the depth of the boundary layer BLt and thus a fresh laminar boundary layer is established on the outer surface (20) of the duct which propagates spanwise along the surface to rejoin the leading edge of the aerofoil body.

6 Claims, 4 Drawing Sheets

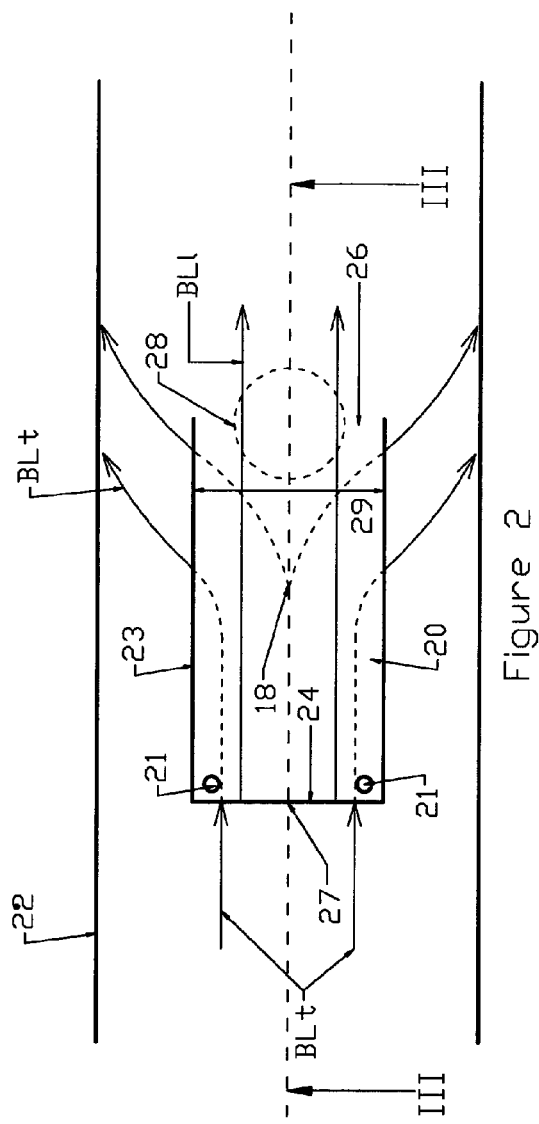
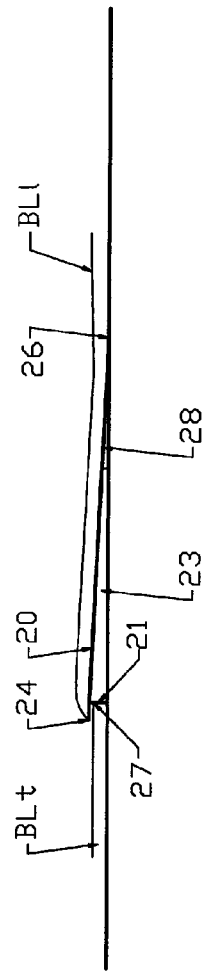
Figure 2
Figure 3

ESTABLISHMENT OF LAMINAR BOUNDARY LAYER FLOW ON AN AEROFOIL BODY

CROSS REFERENCE TO RELATED APPLICATIONS

This application is a National Stage application of International Application No. PCT/GB2007/050773, filed Dec. 20, 2007, the subject matter of which is incorporated by reference in its entirety.

BACKGROUND OF THE INVENTION

This invention relates to the establishment of laminar boundary layer flow on an aerofoil body. In particular, the invention is concerned with maintaining a laminar flow along the attachment line of an aerofoil body with a leading edge inclined to the fluid flow direction, such as a swept back wing or fin. The invention also extends to other aerodynamic or hydrodynamic aerofoil bodies such fins, and bows and keels of watercraft, swept forward or backward.

It is desirable to decrease skin-friction drag on aerodynamic surfaces in order to reduce fuel costs and thus pollution caused by fuel burn. Laminar boundary layers create smaller frictional drag forces on an aerofoil body than turbulent flows. There are therefore significant advantages to be gained by maintaining or re-establishing laminar flow over as much of the surface of the body as possible.

Various proposals exist for maintaining laminar flow over an aerofoil, such as surface suction or surface cooling. However, the success of these forms of active laminar flow control are contingent upon the boundary layer on the attachment line being in a laminar state. The natural boundary layer on the attachment line of a swept wing will be either laminar or turbulent, depending on the value of the Reynolds number of the attachment boundary layer. If this parameter is sufficiently small the flow will be laminar, but above a first, or lower, critical value turbulent flow from the root region will propagate outboard and contaminate the entire attachment line causing the boundary layer there to be turbulent. This is because there tends to be a spanwise component of air flow travelling along a swept back wing from the root to the tip. When the Reynolds number is above some higher second critical value, the boundary layer on the attachment line is unstable and will develop into a turbulent state.

The flow over the swept wings of most transport aircraft tends to be in the intermediate range between the first and second critical values, such that the flow tends to be turbulent unless some action is taken to prevent contamination from the turbulent flow that inevitably forms at the wing root.

There have been various proposals to prevent or mitigate the effects of leading edge boundary layer contamination. In one proposal, laminar flow along the leading edge is re-established by locally reducing the leading edge radius with a bead, thus reducing the Reynolds number on the attachment line. This method makes the boundary layer revert to a laminar state, but the reduced leading edge radius inevitably affected the aerofoil performance in various ways.

U.S. Pat. No. 3,288,399 describes an arrangement in which a shaped "bump" having a bluff front end and an inclined rearward surface is fitted to the leading edge. The bluff front creates a stagnation region whereby a laminar boundary layer is established on the rearward surface. The "bump" has been used successfully in both wind tunnel and flight experiments but a suitable shape can only be obtained by wind tunnel experiments. However, it does appear that there is a Reynolds number limit beyond which the bump fails to prevent contamination.

Whilst laminar flow may be obtained by providing suction openings along the leading edge, this requires a very large amount of suction and is so complicated and expensive that the benefits are not seen to outweigh the disadvantages.

There is therefore a need for an arrangement capable of re-laminarising the boundary layer flow along the attachment line which overcomes or mitigates at least some of the disadvantages of existing arrangements. This invention aims to establish laminar flow by simple means which initiates a fresh laminar boundary layer on the attachment line and disposes of the turbulent boundary layer flow, without providing a gross disturbance to the flow over the body.

BRIEF SUMMARY OF THE INVENTION

Accordingly, this invention provides an aerofoil body in accordance with claim 1. The aerofoil body comprises a leading edge and a duct having an entrance opening extending around the leading edge for receiving spanwise boundary layer flow; and an exit opening disposed spanwise downstream of the entrance opening. The width of the entrance opening of the duct, normal to the leading edge, extends over the range of attachment point positions along the leading edge of the aerofoil body where air impinging on the leading edge passes neither over nor under the aerofoil body.

Thus the turbulent boundary layer flow which tends to form on and to flow spanwise down a swept wing enters the duct, and is directed out of the duct. A fresh laminar boundary layer flow may then continue along the attachment line on the leading edge downstream of the duct entrance, free from contamination. Computational modelling of the aerofoil body in accordance with the invention predicts a 6% reduction in viscous drag for the aerofoil body alone which has the potential to translate into an overall drag reduction for an aircraft of around 2%. This in turn represents a significant saving in fuel consumption.

Preferably the duct entrance is formed by a discontinuity in the leading edge which may for example, provide a gap extending in the chordwise direction. For example, a plate may be attached around the leading edge to form the duct. The plate may be raised so that the edge of the entrance opening stands proud of the surface of the leading edge at the spanwise upstream end, for example supported by pillars. The plate may be sloped in the spanwise direction towards the surface of the leading edge so as to be continuous with the leading edge at a spanwise downstream end thereof. With this arrangement the sides of the plate form a pair of exit openings to direct flow entering the duct out into the flow downstream chordwise of the leading edge. Such discharge flow has been found not to disturb laminar flow which may be established on the outer surface of the plate.

Conveniently, the plate is rectangular, and is curved so as to follow the contour of the leading edge. The spanwise upstream end of the plate forming the duct entrance may additionally be curved or drooped towards the leading edge in order to assist with flow attachment. With a rectangular shape the side edges of the plate which form the two duct exits are arranged to discharge flow substantially normal to the spanwise boundary layer flow.

The plate may alternatively be, for example, delta-shaped so that it forms exit openings arranged to discharge air flow at less than 90° to the spanwise direction of flow along the leading edge. In the context of this document reference to an acute angle is intended to encompass angles greater than 0° and up to and including 90°.

In a preferred embodiment the height or spacing of the duct entrance above the leading edge of the aerofoil body is greater than the depth of the spanwise boundary layer flow, whereby a new laminar flow can form over the outer surface of the plate.

Alternatively, the duct entrance may be in the form of an aperture in the leading edge surface communicating with a chamber in the aerofoil body. A channel may be provided to discharge flow for example to an exit aft of the aerofoil body. A pump may be provided between the duct chamber and the exit channel.

BRIEF DESCRIPTION OF THE SEVERAL VIEWS OF THE DRAWINGS

The invention will now be described, by way of example, with reference to the accompanying drawings, in which:

FIG. 2 is a schematic front view partly broken away of the leading edge region of an aerofoil body according to an embodiment of the present invention;

FIG. 3 is a section view partly broken away of the arrangement of FIG. 2 taken on lines III-III;

DETAILED DESCRIPTION OF THE PREFERRED EMBODIMENTS OF THE INVENTION

Figure 1:
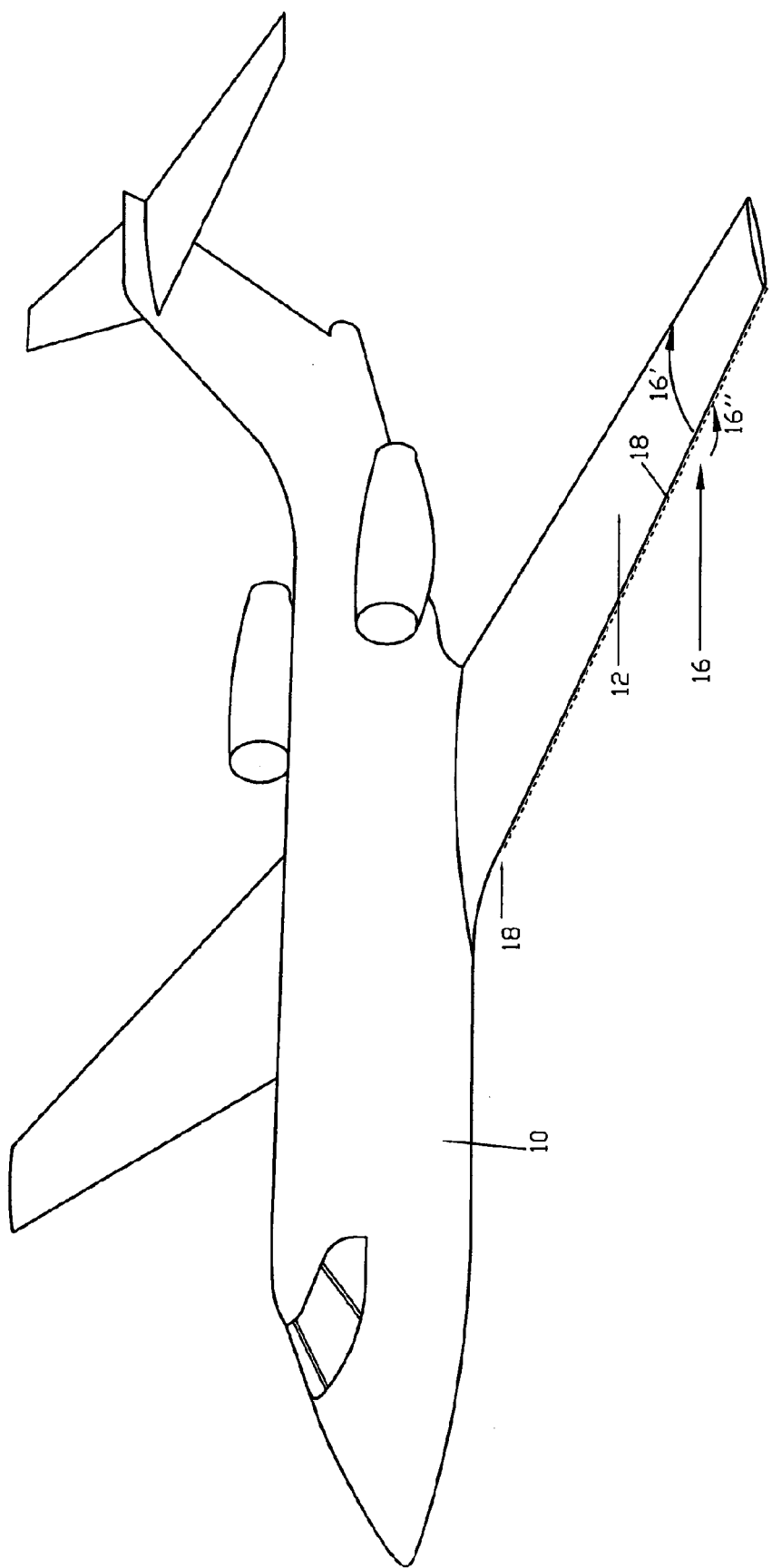
FIG. 1 is a schematic perspective view of an aircraft which may have a wing comprising an aerofoil body in accordance with the invention.

Referring to FIG. 1, an aircraft has a fuselage 10 and aerofoil bodies in the form of a swept wing 12. When in normal forward flight, the air flow over the wings, indicated by the arrows 16 splits at the leading edge of the wing into air flowing past the upper surface (arrows $16^1$) and air flowing past the lower surface ($16^{11}$). Between these is a point where the air neither passes over nor under the wing known as an attachment point, which is at a relatively high pressure. The locus of the attachment points spanwise along the leading edge defines the attachment line which is indicated by the dotted line 18 in FIG. 1. Air impinging on the leading edge of the wing also tends to move spanwise along the wing in the direction of sweep. Such flow may be laminar but may become turbulent due to discontinuities at the wing root or at a pylon, or simply due to small surface discontinuities or debris on the wing leading edge.

Referring now to FIGS. 2 and 3, an aerofoil body or wing according to the invention includes a plate 20 curved to substantially the same radius as the wing leading edge 22, and positioned to extend around the leading edge to form a duct. The plate 20 has a width 29 sufficient such that it extends far enough, normal to the leading edge of the aerofoil body, for the attachment line 18 to coincide with the plate 20 over the envisaged range of angles of incidence of the wing. Thus, the region of the leading edge coincident with the attachment points, where impinging air flows neither above nor below the wing, changes with respect to the angle of the wing during flight and the width of the plate 20 extends across all possible regions of the leading edge coincident with potential locations of the attachment points during flight.

The spanwise upstream edge 24 of the plate is raised from the leading edge 22 in a direction normal thereto on pillars 21 to form a duct entrance 27. The spanwise downstream end 26 of the plate is faired into the surface of the wing leading edge 22. Between the ends 24, 26, a converging duct is formed underneath the plate, with exit openings 23, substantially triangular in shape, along each side thereof.

In operation, spanwise boundary layer flow $BL_t$, which may be turbulent, enters the duct entrance 27 and encounters a stagnation region 28 in the duct defined by the merger of the downstream end 26 of the plate 20 and the wing leading edge 22. This causes flow to exit laterally either side of the plate 20 from the exit openings 23 defined between the plate 20 and the wing leading edge 22. The upstream end of the plate 20 is spaced above the turbulent boundary layer $BL_t$. A laminar boundary layer flow $BL_l$ may thus be initiated on the outer surface of the plate 20 at the upstream edge 24 of the plate, and may propagate spanwise along the surface of the plate 20 to rejoin the leading edge 22. This establishes a laminar flow on the leading edge of the body downstream spanwise of the plate 20.

Figure 4:
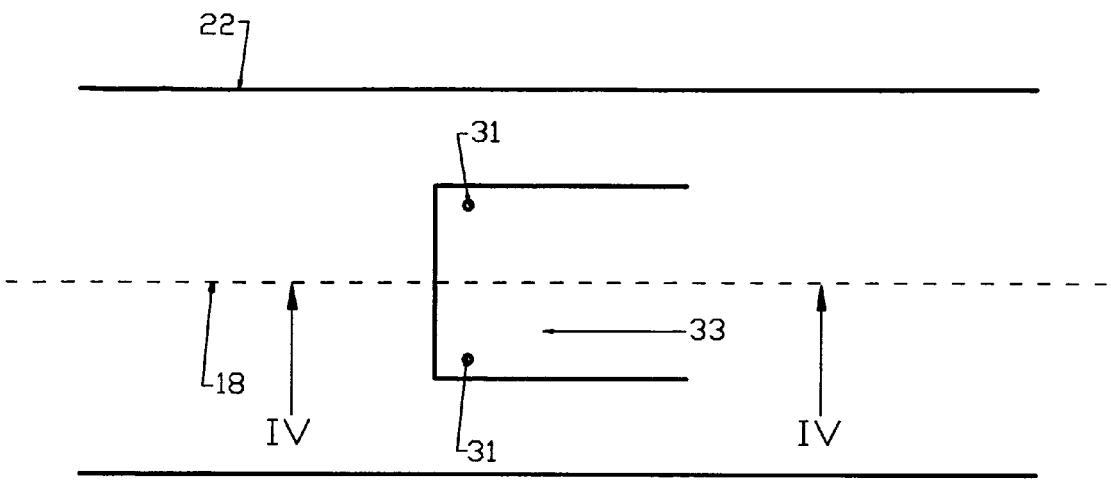
FIG. 4 is a front view of an aerofoil body according to another embodiment of the invention.
Figure 5:
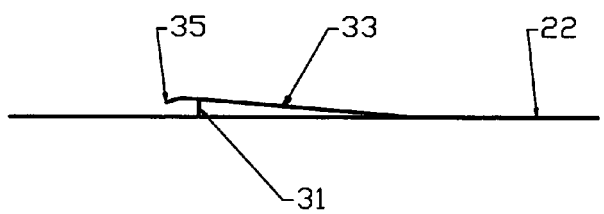
FIGS. 5 and 6 are sectional views of bodies according to further embodiments of the invention.
Figure 6:
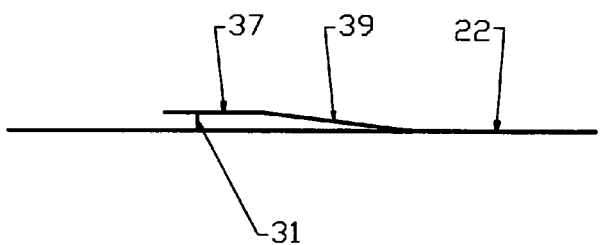

The plate 20 may take many shapes and forms. In the arrangement of FIGS. 2 and 3 it is of generally elongate rectangular form, but other shapes are shown in FIG. 4 to 7. With a rectangular shape the two side edges, which extend between the spanwise upstream duct entrance and the spanwise downstream edge of the plate, are arranged to discharge flow substantially normal to the spanwise flow direction of the boundary layer flow. In FIG. 4 the plate 33 is somewhat shorter. This tends to increase its angle of slope, which tends to cause flow separation at the upstream end and thus turbulent flow over the exposed surface of the plate 33. Accordingly in this embodiment the upstream end 35 of the plate 33 may be drooped or curved towards leading edge as shown in FIG. 5. Alternatively the sectional shape of the plate 33 may be cranked as shown in FIG. 6 so that the upstream end region 37 is generally equispaced or "parallel" to the leading edge and the downstream end portion 39 is sloped with respect thereto.

Figure 7:
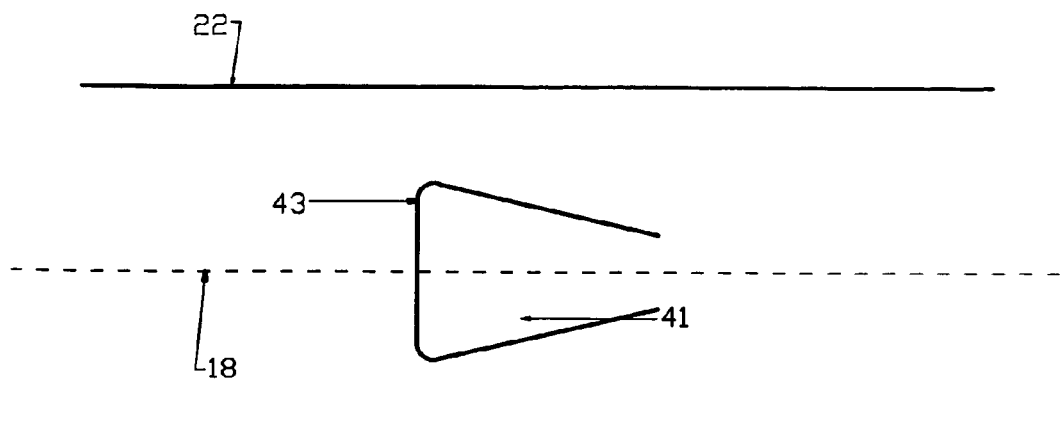
FIGS. 7 and 8 are front views of bodies according to yet further embodiments of the invention.

In FIG. 7, the plate 41 is generally deltoid with rounded corners at the spanwise upstream end 43. With a deltoid shape, the two duct exits are arranged to discharge flow at an angle less than 90° to the spanwise direction of boundary layer flow.

Figure 8:
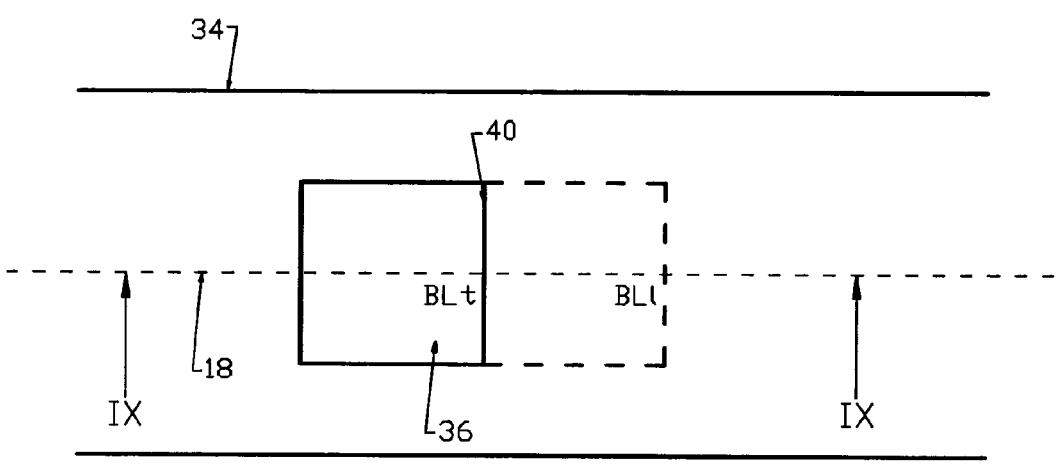
Figure 9:
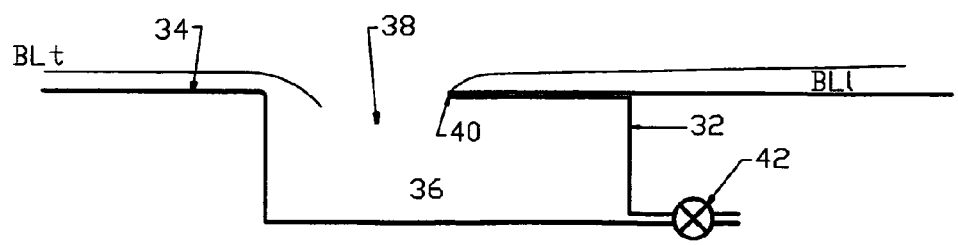
FIG. 9 is a section view through the leading edge taken on Figures IX-IX of FIG. 8.

Referring now to FIGS. 8 and 9, in this embodiment the duct entrance 38 is integral with the leading edge surface of the wing. The duct 36 takes the form of a plenum chamber, with the entrance being an aperture opening onto and extending around the leading edge surface. The downstream spanwise end of the aperture 38 defines a free edge 40 for initiating a laminar boundary layer flow. The plenum chamber 36 is arranged to draw off the turbulent boundary layer $BL_t$ flowing along the attachment line 18 upstream spanwise of the entrance aperture 38 to prevent contamination of the laminar boundary layer downstream. In this embodiment a suction pump 42 may be employed to draw the turbulent boundary layer into the plenum chamber 36 and to discharge it along a channel 44 to an exit opening aft of the wing. Alternatively the flow may discharge naturally due to the lower pressure at the exit of the channel 44.

In tests some of the above devices were shown successfully to prevent turbulent contamination up to Reynolds numbers close to the linear stability limit over a range of different sweep angles. The devices had considerable incidence tolerance and the details of the shapes used do not appear to be critical. Initial studies indicate that the devices as set out above will be simpler and cheaper to install than the only presently viable alternative, which is suction.

Whilst the flow downstream chordwise of the ducts may become turbulent, provided the flow can be kept laminar along the attachment line, worthwhile drag reductions can be achieved on otherwise turbulent wings. For example, about 1-2% of the surface flow may be caused to be laminar by means of this invention, achieving a reduction in wing skin-friction of 3-6%. This is because the skin friction of turbulent flow is very high around the attachment line. If the invention is used in conjunction with known suction methods along the remaining surface of the wing, a larger proportion of the flow might be kept laminar. To achieve this, several ducts may be provided at intervals along the leading edge of the aerofoil or wing. For example, about five ducts might be suitable for a medium sized transport aircraft.

Furthermore the maximum lift coefficient may be enhanced when the flow on the leading edge is laminar.

Another important feature of this invention is that the ability to maintain the attachment line boundary layer laminar means that the heat transfer across the boundary layer is less than with a turbulent layer. For vehicles operating in extreme conditions, for example re-entry vehicles, this means that the insulating/cooling requirements for the leading edge structure may be less extreme, thus reducing costs and weight.

It should also be borne in mind that the embodiments of FIGS. 2 to 7 may all be retrofitted to existing aircraft.

The invention claimed is:

1. An aerofoil body comprising: a leading edge, the leading edge including an attachment line being a region where air impinging on the region flows in a boundary layer spanwise along the leading edge and a duct, the duct having a duct entrance for receiving spanwise flow along the leading edge of the aerofoil body, wherein the duct is formed by the leading edge of the aerofoil body and a plate member attached over and around the leading edge, at a spanwise upstream end of the plate member the plate member being spaced from the leading edge to form with the leading edge the duct entrance which extends around the leading edge and has a width which extends over the range of positions of the attachment line and in that the duct further comprises a duct exit for discharging flow, the plate member abutting the leading edge of the aerofoil body at a spanwise downstream end of the plate member whereby the duct exit is disposed spanwise downstream of the duct entrance and is formed along a side edge of the plate member extending between the spanwise upstream and downstream ends thereof.

2. An aerofoil body as claimed in claim 1, in which the duct entrance is formed by a discontinuity in the leading edge.

3. An aerofoil body as claimed in claim 1, in which the duct exit is arranged to discharge flow at an acute angle to the spanwise direction of flow along the leading edge.

4. An aerofoil body as claimed in claim 1, wherein the plate member has opposing side edges and each side edge forms a duct exit in combination with the leading edge.

5. An aerofoil body as claimed in claim 4, in which the plate member is rectangular, and is curved to substantially the same profile as the leading edge.

6. An aerofoil body as claimed in claim 1, in which the spacing of the duct entrance above the leading edge is greater than the depth of the spanwise boundary layer flow.

* * * * *